UNITED STATES PATENT OFFICE.

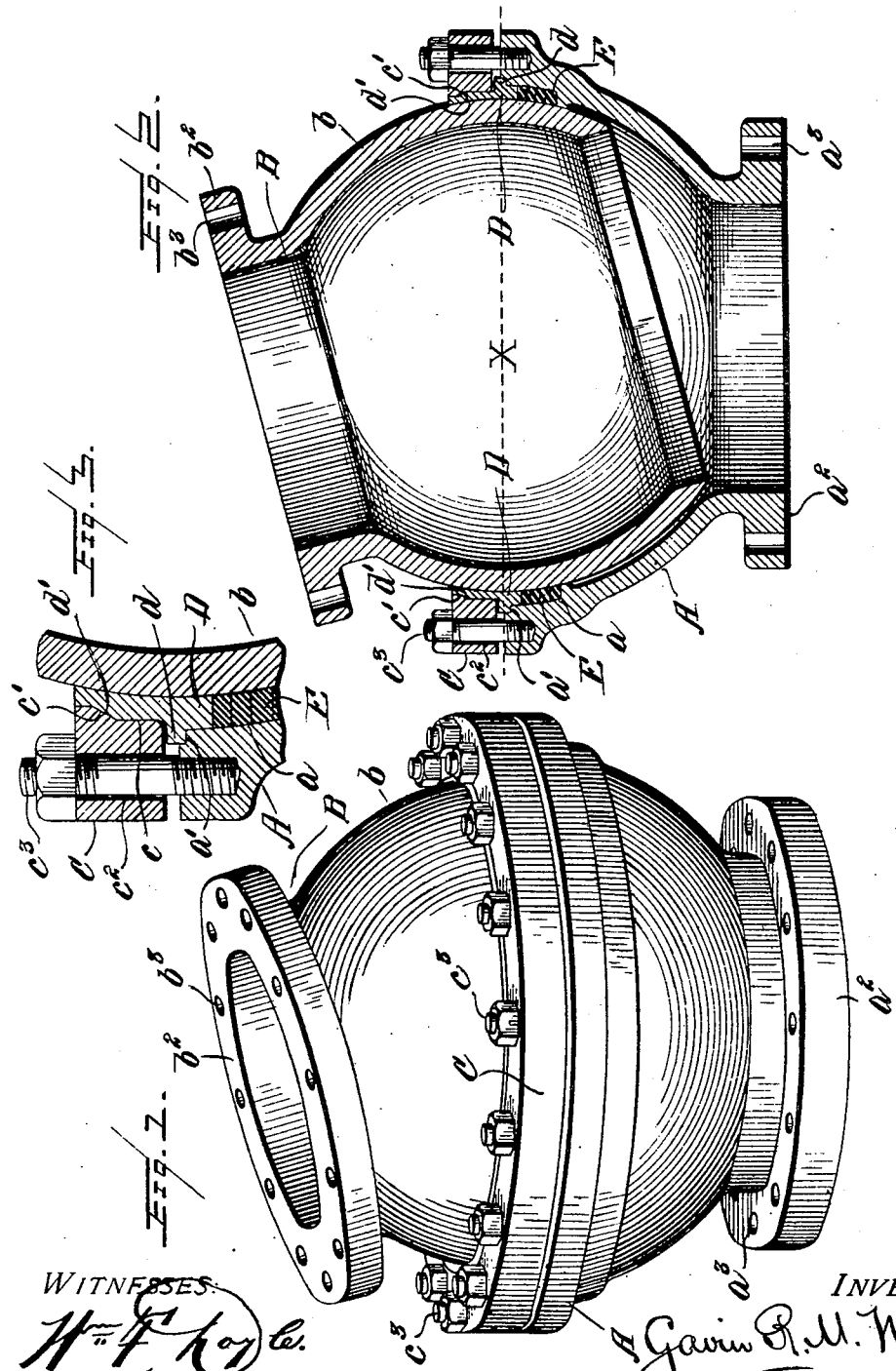

GAVIN R. M. WILCOX, OF NEWBURGH, NEW YORK.

FLEXIBLE JOINT.

No. 855,739.  Specification of Letters Patent.  Patented June 4, 1907.

Application filed November 30, 1906. Serial No. 345,818.

*To all whom it may concern:*

Be it known that I, GAVIN R. M. WILCOX, a citizen of the United States, residing at Newburgh, in the county of Orange and State of New York, have invented certain new and useful Improvements in Flexible Joints; and I do hereby declare the following to be a full, clear, and exact description of the invention, such as will enable others skilled in the art to which it appertains to make and use the same.

My invention consists in the novel features hereinafter described reference being had to the accompanying drawing which illustrates one form in which I have contemplated embodying my invention, and said invention is fully disclosed in the following description and claims.

The object of my said invention is to provide a flexible joint for use with steam, water, air, oil or other pipe lines.

In carrying out my invention I employ a socket section or bowl, and a ball section having a spherical portion extending within the bowl, a bearing ring engaging the spherical portion so as to form a bearing and joint therewith, said bearing ring being secured and supported in connection with the bowl section by means of a clamping ring, so that the bearing ring is reinforced throughout by heavy cast portions of the bowl and clamping ring. A soft packing is also provided within the bowl section to protect the bearing portions from the action of any dirt or grit which might otherwise cause wear of engaged parts, and provision is made whereby the tightening up of the clamping ring will compress the bearing ring upon its inclosed ball or spherical portion.

Referring to the drawings, Figure 1 is a perspective view of a flexible joint embodying my invention. Fig. 2 is a vertical sectional view of the same. Fig. 3 is a detail sectional view of a portion of the joint drawn to an enlarged scale.

In the form of my invention here shown, A represents the female member of the coupling or joint, which I term the bowl section. This section is substantially hemispherical and is provided at its larger end with an annular packing recess $a$ formed in its inner face, and a shallow annular recess $a'$ formed in the face or end of the bowl, adjacent to the packing recess. The bowl section is also provided at its opposite end with means for connecting it in a line of piping, in this instance a flange $a^2$ provided with bolt holes $a^3$ as shown, although any other means for connecting it to a pipe section, may be provided.

B represents the male member of the joint or coupling, which I term the ball section, and which comprises a hollow ball or spherical section $b$, having its exterior or portions thereof ground to form a spherical bearing surface. This section is also provided with means for connecting it to a pipe section, as the flange $b^2$ provided with bolt holes $b^3$, as shown.

C represents the holding or clamping ring, which has its inner face provided with a portion $c$ parallel to the axis of the ring and with an inclined shoulder $c'$ extending inwardly adjacent to the outer face of the ring. This ring C is also provided with bolt holes $c^2$ to receive bolts $c^3$, for connecting the ring C to the bowl section A. In this instance the bolts $c^3$ are threaded at both ends and one end of each bolt is screwed into a threaded aperture in the face of the bowl section as shown, but this is not essential.

D represents the packing and bearing ring, preferably formed of brass or bronze, or other bearing metal, the interior surface of which is ground to provide a spherical bearing surface to fit the ball $b$, with a bearing fit, so that this ring serves the purpose of a packing and also that of a bearing and support for the ball $b$. The ring D has one end (the lower end in Figs. 2 and 3) of a thickness to fit snugly the outer portion of the packing recess, $a$ of the bowl section A and is provided above said portion with an outwardly extending annular rib $d$, which fits into the annular recess $a'$. Above the annular rib $d$ the ring D is preferably somewhat reduced in thickness and is provided with a straight outer face to fit within the portion $c$ of the holding or clamping ring C and with a beveled or inclined shoulder $d'$ to engage the inclined shoulder $c'$ of the said holding ring.

The relation of the bearing and packing ring D and the holding ring C are such that the inclined shoulders $c'$, $d'$ are brought into engagement before the ring C is drawn into contact with the rib $d$ and by tightening up the screws $c^3$ and further drawing the holding ring C toward the bowl section A, the inclined shoulders $c'$, $d'$ will tend to force the bearing ring more firmly upon the ball $b$ of the ball section B, thereby providing a certain amount of adjustment and enabling a perfect joint to be secured.

Before placing the ring D in position the packing recess $a$ is partially filled with a soft packing indicated at E. For this purpose I prefer to use square braided asbestos packing when the joints are intended for use in connection with steam pipes and square flax or hemp packing when intended for use with pipes conveying water. I may, however, employ any soft packing which is to a greater or less extent compressible or elastic.

The soft packing E is ordinarily compressed within the packing recess $a$ when the packing and bearing ring D is placed in position with a portion thereof inserted in the said recess, and this soft packing serves as a wiper in preventing sand, sediment or other foreign matter from being carried to the bearing ring D and thus prevents the abrasion of the bearing ring D which might otherwise result when the parts of the joint are moved with respect to each other. The soft packing E also assists in making the joint tight.

It is to be noted that every portion of the brass (or other metal) bearing and packing ring D is reinforced or backed on the exterior by either portions of the bowl section A or by the heavy holding ring C, so as to practically relieve it from all strain, and throw all the lateral strain on the heavy reinforcing portions of the joint. The said bearing and packing ring is also rigidly held in place by the bowl section A and the holding ring C. It is also to be noted that the bearing and packing ring D extends both above and below the horizontal plane (indicated by dotted lines Fig. 1 at $x$) of the center of the ball portion $b$, or in other words on both sides of a plane perpendicular to the axis of the bowl and passing through the center of the spherical portion $b$, thus receiving practically all of the friction or wear between the parts on the ground bearing surfaces of the ball $b$, and the ring D.

What I claim and desire to secure by Letters Patent is:—

1. In a flexible joint, the combination with the bowl section having an annular packing recess, a ball section provided with a substantially spherical portion, and a holding ring, of a bearing and packing ring having a portion within the said packing recess, and a portion extending outside of said bowl and lying between said holding ring and said spherical portion, said holding ring and said bearing and packing ring being provided the one with inclined portions constructed to engage the other for forcing the bearing and packing ring laterally into tight engagement with the said spherical portion and adjustable devices for connecting said holding ring to said bowl, substantially as described.

2. In a flexible joint, the combination with a part having a bowl, and provided with an annular packing recess within the bowl, of a part provided with a substantially spherical portion, a bearing and packing ring having portions extending on both sides of a plane perpendicular to the axis of said bowl and passing through the center of said spherical portion, said bearing and packing ring having a portion extending into said packing recess, and portions extending entirely outside of said bowl and having its inner face fitting said spherical portion, a holding ring surrounding the portions of the bearing and packing ring, outside of said bowl, bolts connecting said holding ring and bowl rigidly together, and a soft packing located in said packing recess and serving as a wiper for said bearing and packing ring, substantially as described.

In testimony whereof I affix my signature, in the presence of two witnesses.

GAVIN R. M. WILCOX.

Witnesses:
WILLIAM J. WYGANT,
J. D. WILSON, Jr.